United States Patent
Whurr

(10) Patent No.: US 7,178,338 B2
(45) Date of Patent: Feb. 20, 2007

(54) VARIABLE AREA NOZZLE

(75) Inventor: John R. Whurr, Derby (GB)

(73) Assignee: Rolls-Royce plc, London (GB)

(*) Notice: Subject to any disclaimer, the term of this patent is extended or adjusted under 35 U.S.C. 154(b) by 0 days.

(21) Appl. No.: 11/028,321

(22) Filed: Jan. 4, 2005

(65) Prior Publication Data
US 2005/0229586 A1    Oct. 20, 2005

Related U.S. Application Data

(63) Continuation of application No. 10/383,554, filed on Mar. 10, 2003, now abandoned.

(30) Foreign Application Priority Data

Mar. 12, 2002  (GB) ................................. 0205701.6

(51) Int. Cl.
    *F02K 1/00*    (2006.01)
(52) U.S. Cl. ...................... 60/771; 60/263; 239/265.19
(58) Field of Classification Search ................ 60/232, 60/262, 263, 770, 771; 239/265.13, 265.27, 239/265.11, 265.19
    See application file for complete search history.

(56) References Cited

U.S. PATENT DOCUMENTS

| | | | |
|---|---|---|---|
| 2,570,629 A * | 10/1951 | Anxionnaz et al. .... 239/265.33 |
| 2,828,603 A * | 4/1958 | Laucher ........................ 60/761 |
| 3,678,692 A * | 7/1972 | Heise ............................ 60/247 |
| 3,750,402 A * | 8/1973 | Vdoviak et al. ............... 60/762 |
| 3,841,091 A * | 10/1974 | Sargisson et al. ............. 60/224 |
| 4,043,508 A * | 8/1977 | Speir et al. ............ 239/265.19 |
| 4,044,555 A * | 8/1977 | McLoughlin et al. ......... 60/264 |
| 4,244,294 A * | 1/1981 | Frignac et al. ............... 102/374 |
| 4,527,388 A * | 7/1985 | Wallace, Jr. .................. 60/204 |
| 4,537,026 A * | 8/1985 | Nightingale .................. 60/264 |
| 4,802,629 A * | 2/1989 | Klees ..................... 239/265.19 |
| 5,038,559 A * | 8/1991 | Blackmore .................... 60/204 |
| 6,487,848 B2 * | 12/2002 | Zysman et al. ............... 60/262 |
| 6,718,752 B2 * | 4/2004 | Nesbitt et al. ................. 60/204 |
| 6,786,038 B2 * | 9/2004 | Lair .......................... 60/226.1 |
| 6,813,877 B2 * | 11/2004 | Birch et al. ................. 60/226.1 |
| 6,945,031 B2 * | 9/2005 | Lair .......................... 60/226.1 |

* cited by examiner

*Primary Examiner*—William H. Rodriguez
(74) *Attorney, Agent, or Firm*—W. Warren Taltavull; Manelli Denison & Selter PLLC

(57) ABSTRACT

An exhaust nozzle assembly for a gas turbine engine, the assembly comprises a main axis, an inner nozzle, an outer nozzle, a translatable centre-body and an actuator for translating the centre-body between a forward position and a rearward position. The centre-body is disposed radially inwardly of the inner nozzle thereby partly defining an inner duct for a core engine gas flow, an outer duct for a bypass gas flow is defined by the inner nozzle and the outer nozzle. The outer nozzle extends downstream of the inner nozzle and with the centre-body defines a final mixing duct having a final exhaust exit area. When the centre-body is in the forward position the final exhaust exit area is at a maximum area, and when the centre-body is in a rearward position the final exhaust exit area is at a minimum area.

14 Claims, 4 Drawing Sheets

VARIABLE AREA NOZZLE

This application is a continuation of Ser. No. 10/383,554 filed on Mar. 10, 2003 now abandoned.

FIELD OF THE INVENTION

The present invention relates to a variable exhaust area nozzle for a gas turbine engine.

BACKGROUND OF THE INVENTION

An aircraft is required to perform many different operational modes in a single flight cycle. Such modes comprise taxiing, take-off, climb, cruise, holding, decent and landing to which the engines of the aircraft must also comply with related performance requirements.

Conventional gas turbine engines, particularly turbofans, operate at relatively low exhaust nozzle pressure ratios, where it is sufficient to use a convergent nozzle to develop thrust, as the pressure loss due to external expansion of the working exhaust gases is relatively low. With increasing flight speed the nozzle pressure ratio increases, and the expansion of the gases needs to be controlled to reduce losses, normally using a convergent-divergent nozzle. In the ideal setting at cruise, the nozzle exit pressure is reduced to ambient by the divergent part of the nozzle. If the nozzle comprises fixed convergent-divergent geometry, optimised for cruise, the losses at lower nozzle pressure ratios would increase due to either over expansion of the exhaust gases or exhaust flow separation. Thus it is preferable for the area ratio of the convergent-divergent nozzle to be varied with flight speed and nozzle pressure ratio.

It is well known to vary the area of an exhaust nozzle; one such application is the Olympus™ engines on Concorde™ aircraft as well as the propulsion systems on most of the World's military fighter aircraft. However, these are generally complex multi-variable devices, typically consisting of systems of overlapping petals and comprising numerous moving components and multiple actuation systems.

U.S. Pat. No. 4,527,388 granted to The Garrett Corp., discloses a turbofan engine comprising a core engine and a fan bypass passage, both discharging streams of pressurised gases through a mixing section and into an exhaust nozzle. The exhaust nozzle defines a throat through which the combined gas streams are accelerated and discharged therethrough. The exhaust nozzle also comprises a single axially moveable and rearwardly tapering centre-body, which is moveable relative to the remainder of the exhaust nozzle to simultaneously vary both the throat area and one of the respective fluid flow areas through which the core engine and fan bypass passage fluid streams flow. When the engine produces high power the centre-body is translated rearward, for instance at takeoff, such that the areas of the exhaust nozzle and core are both minimum. This increases the velocity of the gas stream and intrinsically disadvantageously increases the amounts of exhaust or jet noise. Furthermore, at a lower engine power, for instance relatively slow cruise; the centre-body is in its forward-most position where the mixing section is generally divergent in area. This cruise position leads to a reduced gas stream velocity relative to the ambient air and disadvantageously provides a less thrust-capable engine.

SUMMARY OF THE INVENTION

Therefore it is an object of the present invention to provide a means for varying the areas of the final exhaust nozzle and the core exhaust exit such that; the final exhaust nozzle area is increased at take-off to maximise airflow and minimise jet velocity; the core exhaust exit area is adjustable during take-off to optimise the jet velocity profile to further reduce jet noise.

A further object of the present invention is to provide a means for varying the aerodynamic profile of the exhaust nozzle such that; at high nozzle pressure ratios, for instance at cruise, the nozzle comprises a convergent-divergent profile; at lower nozzle pressure ratios, for instance aircraft take-off, decent or hold, the nozzle comprises a predominantly convergent profile.

Accordingly a first aspect of the present invention seeks to provide an exhaust nozzle assembly for a gas turbine engine, the assembly comprises a main axis, an inner nozzle, an outer nozzle, a translatable centre-body and a means for translating the centre-body between a forward position and a rearward position; the centre-body is disposed radially inwardly of the inner nozzle thereby partly defining an inner duct for a core engine gas flow, an outer duct for a bypass gas flow is defined by the inner nozzle and the outer nozzle, the outer nozzle extends downstream of the inner nozzle and with the centre-body defines a final mixing duct having a final exhaust exit area; wherein when the centre-body is in the forward position the final exhaust exit area is at a maximum area; when the centre-body is in a rearward position the final exhaust exit area is at a minimum area and the centre-body and the outer nozzle define, in axial flow series, a convergent portion and a divergent portion.

Preferably, the inner nozzle defines a core exhaust exit area, and when the centre-body is in the forward position the core exhaust exit area is at a maximum area, and when the centre-body is in a rearward position the core exhaust exit area is at a minimum area.

Preferably, the centre-body comprises, in a downstream direction, a parallel portion, a waist, a diverging section, a maximum diameter portion and a taper; the parallel portion is substantially parallel and a part of which is slidably engaged with a static core engine structure.

Preferably, when the centre-body is in the forward position the waist is generally axially aligned with the core exhaust exit area thereby providing the maximum core exhaust exit areas; when the centre-body is in the rearward position the parallel portion is axially aligned with core exhaust exit area thereby minimising the exit area.

Preferably, when the centre-body is in the forward position the downstream end of the taper is generally axially aligned with the final exhaust exit area thereby providing the maximum final exit area; when the centre-body is in the rearward position the maximum diameter portion is generally axially aligned with the final exhaust exit area thereby minimising the final exit area.

Preferably, a means for translating the centre-body between a forward position and a rearward position comprises at least one actuator mounted within and to the static core engine structure, the actuator having a piston which is attached to a mounting on the translating centre-body.

Preferably, when the centre-body is in the rearward position the engine is in high-speed mode and when the centre-body is in the forward position the engine is in low-speed mode.

Preferably, when the engine operates between low-speed mode and high-speed mode the centre-body is positioned between the forward position and the rearward position.

In an alternative second embodiment of the present invention, an exhaust nozzle assembly for a gas turbine engine comprises a main axis, an inner nozzle, an outer nozzle, a translatable centre-body and a means for translating the centre-body between a forward position and a rearward position; the centre-body is disposed radially inwardly of the inner nozzle thereby partly defining an inner duct for a core engine gas flow, an outer duct for a bypass gas flow is defined by the inner nozzle and the outer nozzle, the outer nozzle extends downstream of the inner nozzle and with the centre-body defines a final mixing duct having a final exhaust exit area; wherein when the centre-body is in the forward position the final exhaust exit area is at a maximum area; when the centre-body is in a rearward position the final exhaust exit area is at a minimum area; wherein the inner nozzle defines a core exhaust exit area, and when the centre-body is in the forward position the core exhaust exit area is at a minimum area, and when the centre-body is in the rearward position the core exhaust exit area is at a maximum area.

Preferably, the centre-body comprises, in a downstream direction, a parallel portion, a diverging section, a maximum diameter portion and a taper; the parallel section is substantially parallel and a part of which is slidably engaged with a static core engine structure.

Preferably, when the centre-body is in the forward position or the rearward position the diverging section is generally axially aligned with core exhaust exit area thereby providing a constant core exhaust exit area.

Preferably, when the centre-body is in the forward position the waist is axially aligned with the core exhaust exit area thereby providing the maximum core exhaust exit areas; when the centre-body is in the rearward position the parallel portion is axially aligned with core exhaust exit area and thereby minimising the core exhaust exit area.

Preferably, when the centre-body is in the rearward position the engine is in high-speed mode and when the centre-body is in the forward position the engine is in low-speed mode.

Preferably, when the engine operates between low-speed mode and high-speed mode the centre-body is positioned between the forward position and the rearward position.

BRIEF DESCRIPTION OF THE DRAWINGS

The present invention will be more fully described by way of example with reference to the accompanying drawings in which.

DETAILED DESCRIPTION OF THE INVENTION

Figure 1A:
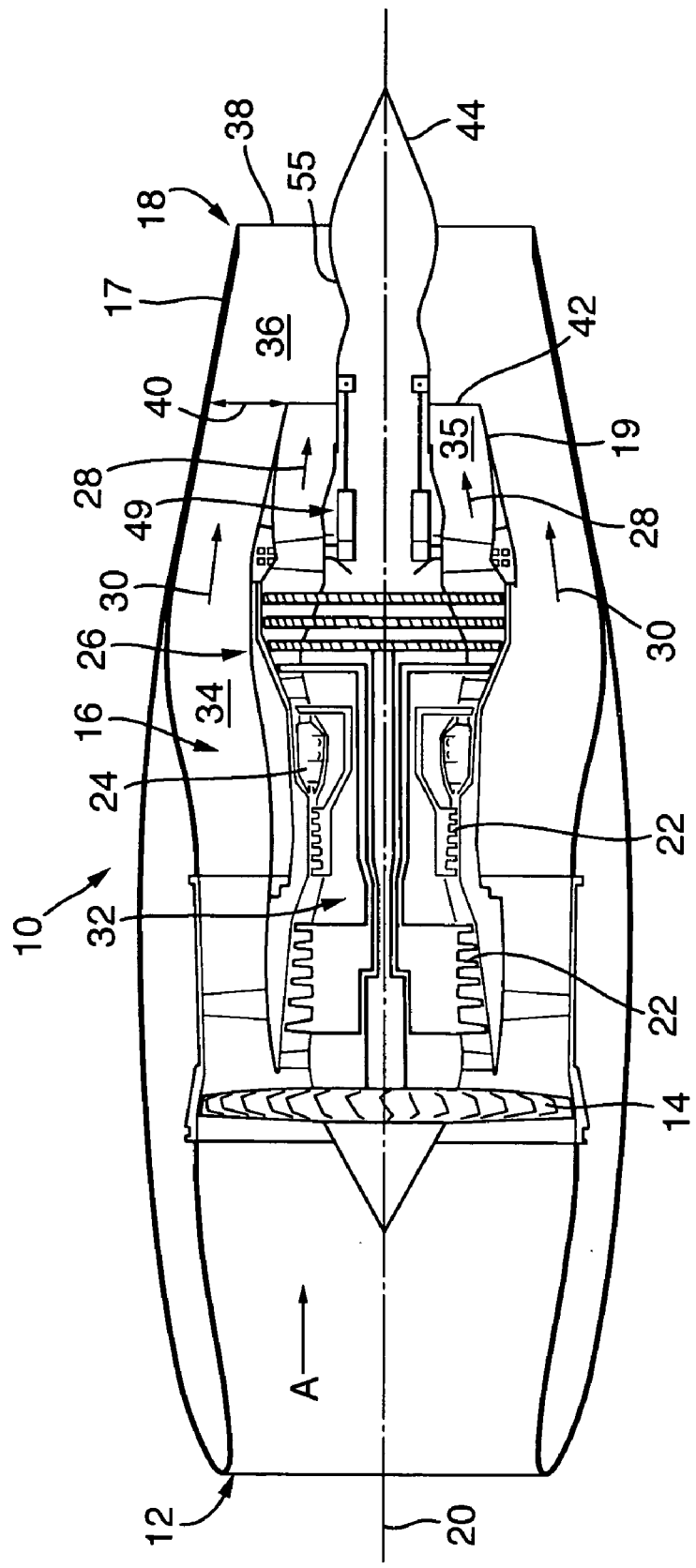
FIG. 1A is a schematic section of a ducted fan gas turbine engine incorporating an exhaust nozzle assembly, which itself comprises a translating centre-body in accordance with the present invention.
Figure 2B:
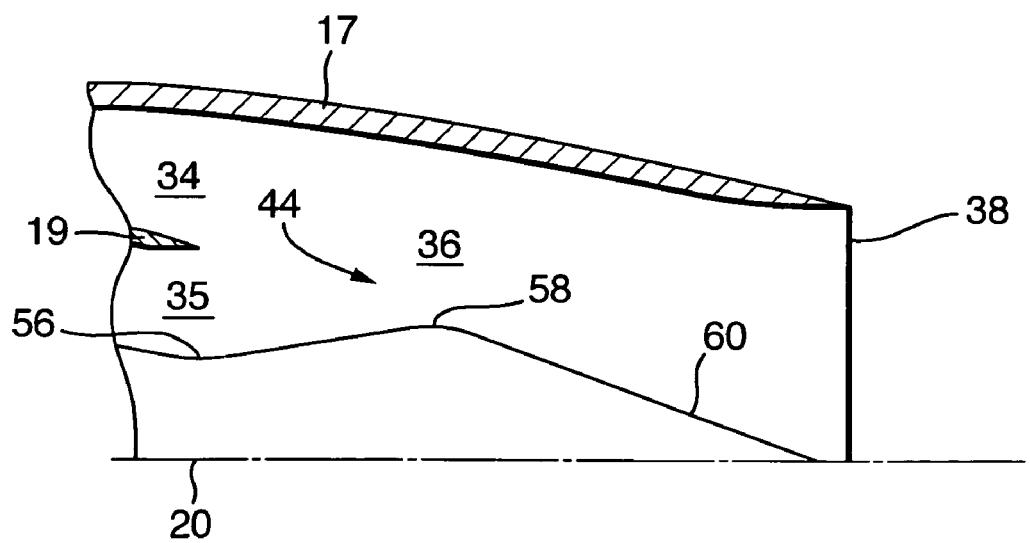
FIG. 2B is a part schematic section of the exhaust nozzle assembly of FIG. 2A.
Figure 2A:
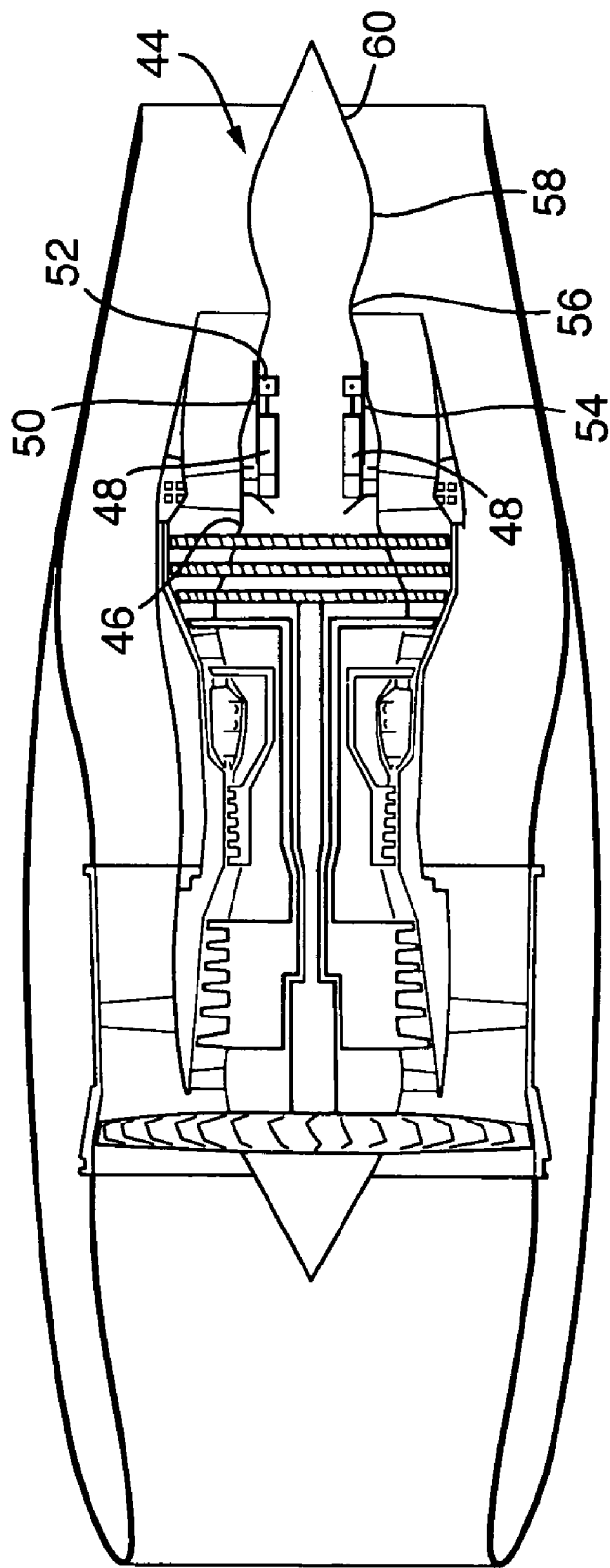
FIG. 2 is a schematic section of a ducted fan gas turbine engine incorporating an exhaust nozzle assembly, which itself comprises a translating centre-body in accordance with the present invention.

With reference to FIGS. 1A and 2A where reference numerals of one figure denote like elements of the other figure, a ducted fan gas turbine engine 10 comprises, in axial flow series an air intake 12, a propulsive fan 14, a core engine 16 and an exhaust nozzle assembly 18 all disposed about a main engine axis 20. The exhaust nozzle assembly 18 comprises an outer nozzle 17 and a radially inner nozzle 19. The core engine 16 comprises, in axial flow series, a series of compressors 22, a combustor 24, and a series of turbines 26. The direction of airflow through the engine 10, in operation, is shown by arrow A and the terms upstream and downstream used throughout this description are used with reference to this general flow direction. Air is drawn in through the air intake 12 and is compressed and accelerated by the fan 14. The air from the fan 14 is split between a core engine flow 28 and a bypass flow 30. The core engine flow 28 enters core engine 16, flows through the core engine compressors 22 where it is further compressed, and into the combustor 24 where it is mixed with fuel, which is supplied to, and burnt within the combustor 24. Combustion of the fuel with the compressed air from the compressors 22 generates a high energy and velocity gas stream, which exits the combustor 24 and flows downstream through the turbines 26. As the high energy gas stream flows through the turbines 26 it rotates turbine rotors extracting energy from the gas stream which is used to drive the fan 14 and compressors 22 via engine shafts 32 which drivingly connect the turbines rotors with the compressors 22 and fan 14. Having flowed through the turbines 26 the high energy gas stream from the combustor 24 still has a significant amount of energy and velocity and it is exhausted, as a core exhaust stream 28, through a core exhaust exit area 42 of the engine exhaust nozzle assembly 18 into a mixing area 36. The remainder of the air from, and accelerated by, the fan 14 flows within a bypass duct 34 around the core engine 16. This bypass airflow 30, which has been accelerated by the fan 14, flows through a bypass exit area 40 of the exhaust nozzle assembly 18 where it is mixed with the core engine flow 28 in the mixing area 36 and exhausted through a final exhaust area 38 to provide propulsive thrust. The bypass flow 30 provides the majority of the useful propulsive thrust of the engine 10.

A conventional flight cycle for a commercial aircraft comprises take-off, climb, cruise, descent and landing modes. If the aircraft is required to wait for a landing slot, then the flight cycle may also comprise a holding mode. At take-off the engine is at full power and at near full power while the aircraft climbs to cruise altitude. During the cruise phase the engine operates at typically 70–80% of its full power. While the aircraft is descending the engines are reduced to 10–20% of full power.

For commercial aircraft, the engines are designed to be at their most efficient at cruise mode as the greatest proportion of fuel is used during this phase. Thus, for the engine to be efficient at other modes, it is desirable to have a variable area nozzle providing the ability to control the working line and operating points of the engine's propulsive fan 14. Importantly, with the final exhaust area 38 at a maximum, the engine 10 is then able to operate at its maximum flow capacity at takeoff, reducing jet velocity, and consequently jet noise, for any given fan size and thrust level requirement. Variation of the core engine nozzle area 42 enables the core engine performance to be matched and adjusted in accordance with the exhaust jet velocity for the different flight cycle modes. This would enable the jet velocity profile to be optimised to achieve minimum specific fuel consumption at cruise and minimum jet noise at takeoff. In particular, it is the variation of the pressure ratios (the pressure difference of a gas stream and ambient) and gas stream velocities exiting the final nozzle at the different flight cycle conditions that the variable area exhaust nozzle assembly 18 of the present invention is suited to.

In accordance with the present invention, a translating centre-body 44 is incorporated as part of the exhaust nozzle assembly 18. The centre-body 44 is disposed radially inwardly of the inner or core nozzle 19 thereby partly defining an inner or core duct 35 for the flow of core engine gas 28 therethrough. The inner nozzle 19 and the outer nozzle 17 define the outer or bypass duct 34 for the flow of bypass gas 30 therethrough. The outer nozzle 17 extends downstream of the inner nozzle 19 and with the centre-body 44 defines a final mixing duct/area 36. Both the core gas flow 28 and the bypass gas flow 30 discharge into the final mixing duct 36. The centre-body 44 is axially translatable and provides modification of the final exhaust exit area 38 between takeoff and cruise flight conditions.

Figure 1B:
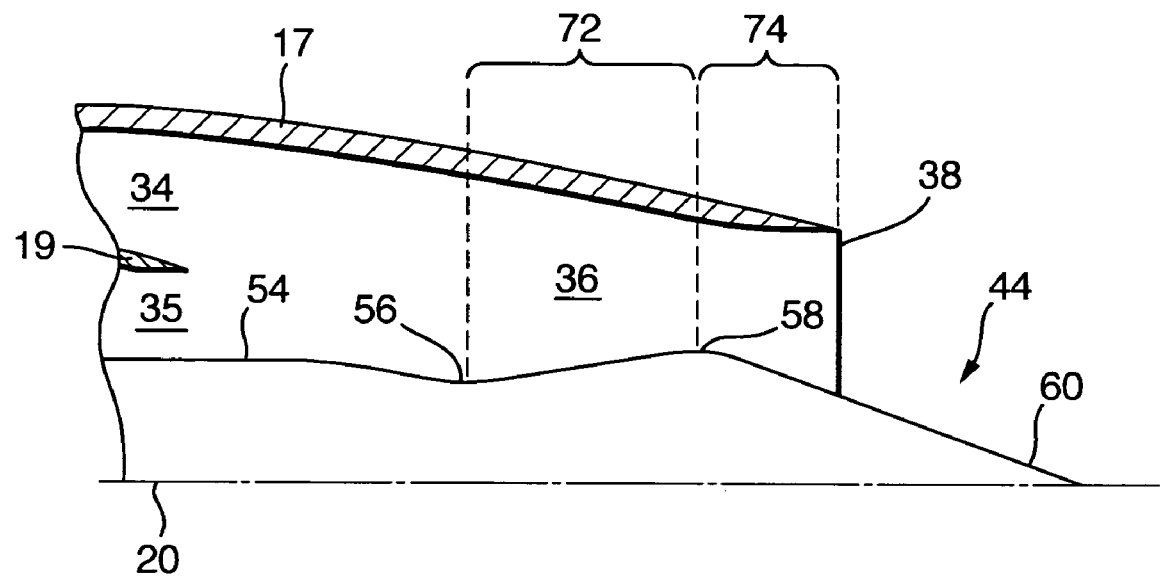
FIG. 1B is a part schematic section of the exhaust nozzle assembly of FIG. 1A.

FIGS. 1A and 1B show the centre-body 44 in a rearward position suitable for cruise flight of an associated aircraft. In this position the final exhaust exit area 38 comprises a convergent-divergent profile that is beneficial for high nozzle pressure ratios, i.e. where there is a relatively large difference in exhaust gas and ambient pressures. FIGS. 2A and 2B show the centre-body 44 in a forward position suitable for take-off or low air-speed of an associated aircraft. In this position the final exhaust exit area 38 comprises a convergent profile for relatively low nozzle pressure ratios. Although FIG. 1B shows the sectional lines of the outer nozzle 17 and centre-body 44 diverging with respect to one another it should be appreciated that the cross-sectional area converges towards the final exhaust exit area 38, i.e. the rate of change of area defined by the nozzle 17 is greater than that of the centre-body 44.

Referring to FIG. 1B, which shows the nozzle assembly in more detail, when the centre-body 44 is in the rearward position the centre-body 44 and the outer nozzle 17 define, in axial flow series, a converging portion 72 and a diverging portion 74. The transition between the converging portion 72 and diverging portion 74 is generally axially aligned with the maximum diameter portion 58 of the centre-body 44. Although divergent, the final exit area 38 is in fact at a minimum exit area for this mode of operation. The divergent portion 74 is required, as the pressure ratio across the exhaust nozzle is such that a convergent nozzle alone cannot achieve complete expansion of the gas stream. The divergent portion 74 is provided to allow full expansion of the exhausted gas stream therefore achieving an increase in thrust over a convergent only exhaust nozzle.

The invention is particularly advantageous for application to high-speed aircraft where the engine/nacelle diameter is more critical, and where a greater variation in nozzle pressure ratio between takeoff and cruise will exist than for a conventional sub-sonic aircraft. The present invention will allow the diameter of the propulsive fan 14 to be minimised for given takeoff thrust and noise requirements, and will facilitate the achievement of good nozzle performance at both takeoff and cruise.

The centre-body 44 is slideably mounted to a static core engine structure 46 and is translated axially by a means for translating the centre-body 49. In this embodiment an annular array of actuators 48 are provided. Each actuator 48 is mounted to the static core engine structure 46 with its piston 50 connected to a mounting 52 disposed to the centre-body 44. The actuator 48 is a hydraulic ram but alternatively it may be an electric screw jack or any other means suitable for translating the centre-body 44 axially between its rearward and forward positions.

FIGS. 1B and 2B show the shape of the centre-body 44 comprising, in axially rearward series, a parallel portion 54, a waist 56, a maximum diameter portion 58 and a taper 60. The parallel portion 54 is substantially parallel and a part of which is disposed radially inwardly of the static core engine structure 46. Alternatively, the parallel portion 54 may be disposed radially outwardly of the static core engine structure 46. Although not shown an airtight sealing means may be provided between the parallel portion 54 and the static core engine structure 46. The waist 56 is of a smaller diameter than the parallel portion 54.

In the axially forward position (FIG. 2B), e.g. for take-off, the centre-body 44 allows both the core exhaust exit area 42 and the final exhaust exit area 38 to be at their maximum flow areas. It should be appreciated that the mixing duct 36 is substantially convergent towards the final exhaust exit area 38. In this position, the waist 56 is axially aligned with the core exhaust exit area 42 and the downstream end of the taper 60 is axially aligned with the final exhaust exit area 38. For cruise operation (FIG. 1B), the centre-body 44 is moved axially rearward partially filling both the core exhaust exit area 42 and the final exhaust exit area 38 thereby reducing their effective areas. It should be appreciated that these axial positions of the centre-body 44 are preferential for the two modes of operation, however, for modes between the cruise and take-off it is intended that the position of the centre-body 33 is altered to be beneficial to the efficient operation of the core engine 16 and propulsive fan 14.

Referring to FIGS. 1A, 1B, 2A and 2B, in summary when the centre-body 44 is in the forward position the final exhaust exit area 38 is at a maximum area (FIGS. 2A, 2B), and when the centre-body 44 is in a rearward position the final exhaust exit area 38 is at a minimum area (FIGS. 1A, 1B). It is preferable that when the centre-body 44 is in the forward position the core exhaust exit area 42 is at a maximum area, and when the centre-body 44 is in a rearward position the core exhaust exit area 42 is at a minimum area.

Figure 3A:
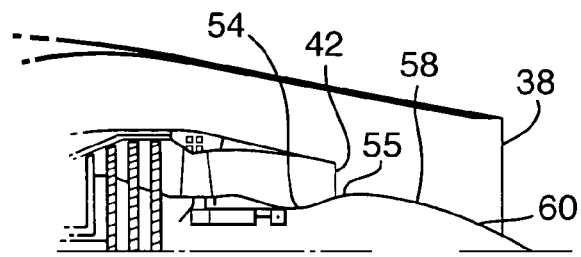
FIG. 3A is a part schematic section of the exhaust nozzle assembly comprising a second embodiment of the translating centre-body.
Figure 3B:
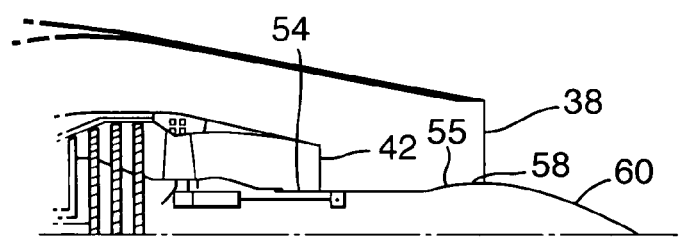
FIG. 3B is a part schematic section of the exhaust nozzle assembly comprising a second embodiment of the translating centre-body.

FIGS. 3A and 3B show an alternative second embodiment of the centre-body 44. The shape of the centre-body 44 comprises, in axially rearward series, a parallel portion 54, a diverging section 55, a maximum diameter portion 58 and a taper 60. This alternative embodiment of the centre-body 44 differs from the preceding design in that there is no waist 56 and the profile of the centre-body 44 comprises the parallel portion 54 blending into the diverging portion 55 to the maximum diameter portion 58. Thus in the axially forward position (as shown in FIG. 3A), e.g. for take-off, the centre-body 44 allows the core exhaust exit area 42 to be at a minimum flow area and the final exhaust exit area 38 to be at its maximum flow area. In this position, part of the diverging portion 55 is axially aligned with the core exhaust exit area 42 and the downstream end of the taper 60 is axially aligned with the final exhaust exit area 38. Although preferred this is not essential and depending on a particular engine application the end of the taper 60 may be axially forward or rearward of the final exhaust exit area 38.

For cruise operation (as shown in FIG. 3B), the centre-body 44 is moved axially rearward increasing the core exhaust exit area 42 and reducing the final exhaust exit area 38. In the cruise or rearward position the mixing duct 36 comprises a similar convergent and divergent portion as shown and described with reference to FIG. 1B.

Both embodiments of the centre-body 44 are beneficial in lowering the working line of the fan as the pressure ratio is further reduced for the propulsive fan 14. Furthermore, either arrangement is particularly advantageous in reducing exhaust noise at take-off.

Figure 4:
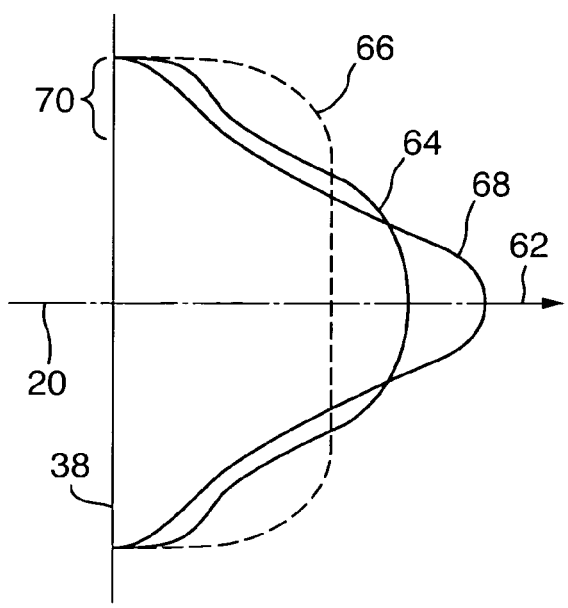
FIG. 4 is a graph showing velocity profiles for a final exhaust exit.

FIG. 4 indicates how the final exhaust exit gas stream velocity profile is advantageously modified for the first embodiment (FIGS. 1A, 1B, 2A, 2B). The x-axis represents gas velocity 62 and the y-axis represents radial height from the central engine axis 20. A typical exit velocity profile for conventional fixed final exhaust nozzle geometry is shown by line 64. The radially outer portion of the exhausted gas flow forms a shear layer region 70 as the exhaust gases mix with the ambient air. It is this shear layer region and particularly at about 5 exhaust diameters downstream where the core gas stream mixes into the shear layer, that exhaust noise is generated. Exhaust noise is related to the velocities of the exhausted gas stream and ambient and generally speaking the greater the peak velocity the greater the noise. It is therefore advantageous to reduce the peak velocity of the exhausted gas flow thereby reducing exhaust noise particularly during take-off. During take-off (FIGS. 2A, 2B) the centre-body 44 is in its forward most position and the final exhaust exit is a maximum and the core exit area is also maximum. This configuration results in the exit velocity profile of line 66. Here the core gas stream velocity is relatively lower, at the centre of the combined gas flow, and the bypass gas stream velocity is relatively higher than that of a conventional fixed geometry nozzle. It should be appreciated that the shear layer region 70, at about 5 exhaust diameters downstream, is subject to significantly reduced exit gas stream peak velocity, thereby reducing exhaust noise.

Alternatively, in some applications, it may be more advantageous to produce a, lower velocity in the radially outer portion of the exhaust gas flow as indicated by line 68. This would be achieved by the second embodiment of the present invention. As exhaust noise is related to the shear layer velocity, the second embodiment is beneficial as it produces a lower shear layer velocity immediately downstream of the nozzle.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An exhaust nozzle assembly for a gas turbine engine, the assembly comprising a main axis, an inner nozzle, an outer nozzle, a translatable centre-body and a means for translating the centre-body between a forward position and a rearward position; the centre-body being disposed radially inwardly of the inner nozzle thereby partly defining an inner duct for a core engine gas flow, an outer duct for a bypass gas flow is defined by the inner nozzle and the outer nozzle, the outer nozzle extends downstream of the inner nozzle and with the centre-body defines a final mixing duct having a final exhaust exit area; wherein in the forward position the centre-body defines the final exhaust exit area at a maximum area; in a rearward position the centre-body defines the final exhaust exit area at a minimum area and the centre-body and the outer nozzle each define, in axial flow series, a convergent portion and a divergent portion.

2. An exhaust nozzle assembly as claimed in claim 1 wherein the inner nozzle defines a core exhaust exit area, and in the forward position the centre-body defines the core exhaust exit area at a maximum area, and in a rearward position the centre-body defines the core exhaust exit area at a minimum area.

3. An exhaust nozzle assembly for a gas turbine engine, the assembly comprising a main axis, an inner nozzle, an outer nozzle, a core exhaust exit area, a final exhaust exit area, a translatable centre-body and a means for translating the centre-body between a forward position and a rearward position; the centre-body being disposed radially inwardly of the inner nozzle thereby partly defining an inner duct for a core engine gas flow, an outer duct for a bypass gas flow is defined by the inner nozzle and the outer nozzle, the outer nozzle extends downstream of the inner nozzle and with the centre-body defines a final mixing duct having a final exhaust exit area; wherein in the forward position the centre-body defines the final exhaust exit area at a maximum area; in a rearward position the centre-body defines the final exhaust exit area at a minimum area and the centre-body and the outer nozzle each define, in axial flow series, a convergent portion and a divergent portion wherein the centre-body comprises, in a downstream direction, a parallel portion, a waist, a diverging section, a maximum diameter portion and a taper; the parallel portion is substantially parallel and a part of which is slidably engaged with a static core engine structure.

4. An exhaust nozzle assembly as claimed in claim 3 wherein in the forward position the centre-body defines the waist generally axially aligned with the core exhaust exit area thereby providing maximum core exhaust exit areas; in the rearward position the centre-body defines the parallel portion axially aligned with said core exhaust exit area thereby minimising said core exhaust exit area.

5. An exhaust nozzle assembly as claimed in claim 3 wherein in the forward position the centre-body defines the downstream end of the taper generally axially aligned with the final exhaust exit area thereby providing the maximum final exit area; in the rearward position the centre-body defines the maximum diameter portion generally axially aligned with the final exhaust exit area thereby minimising the final exhaust exit area.

6. An exhaust nozzle assembly as claimed in claim 3 wherein said means for translating the centre-body between said forward position and said rearward position comprises at least one actuator mounted within and to a static core engine structure, the actuator having a piston which is attached to a mounting on the translating centre-body.

7. An exhaust nozzle assembly as claimed in claim 1 wherein in the rearward position the centre-body defines the engine in high-speed mode and in the forward position the centre-body defines the engine is in low-speed mode.

8. An exhaust nozzle assembly as claimed in claim 1 wherein between low-speed mode and high-speed mode of the engine's operation, the centre-body is positioned between the forward position and the rearward position.

9. An exhaust nozzle assembly for a gas turbine engine, the assembly comprising a main axis, an inner nozzle, an outer nozzle, a translatable centre-body and a means for translating the centre-body between a forward position and a rearward position; the centre-body being disposed radially inwardly of the inner nozzle thereby partly defining an inner duct for a core engine gas flow, an outer duct for a bypass gas flow is defined by the inner nozzle and the outer nozzle, the outer nozzle extends downstream of the inner nozzle and with the centre-body defines a final mixing duct having a final exhaust exit area; wherein in the forward position the centre-body defines the final exhaust exit area at a maximum area; in a rearward position the centre-body defines the final exhaust exit area at a minimum area; wherein the inner nozzle defines a core exhaust exit area, and in the forward position the core exhaust exit area is at a minimum area, and in the rearward position the core exhaust exit area is at a maximum area.

10. An exhaust nozzle assembly as claimed in claim 9 wherein the centre-body comprises, in a downstream direction, a parallel portion, a diverging section, a maximum diameter portion and a taper; the parallel section is substantially parallel and a part of which is slidably engaged with a static core engine structure.

11. An exhaust nozzle assembly as claimed in claim 10 wherein in the forward position or the rearward position the diverging section is generally axially aligned with core exhaust exit area thereby providing a constant core exhaust exit area.

12. An exhaust nozzle assembly for a gas turbine engine, the assembly comprising a main axis, an inner nozzle, an outer nozzle, a core exhaust exit area, a final exhaust exit area, a translatable centre-body and a means for translating the centre-body between a forward position and a rearward position; the centre-body being disposed radially inwardly of the inner nozzle thereby partly defining an inner duct for a core engine gas flow, an outer duct for a bypass gas flow is defined by the inner nozzle and the outer nozzle, the outer nozzle extends downstream of the inner nozzle and with the centre-body defines a final mixing duct having a final exhaust exit area; wherein in the forward position the centre-body defines the final exhaust exit area at a maximum area; in a rearward position the centre-body defines the final exhaust exit area at a minimum area and the centre-body and the outer nozzle each define, in axial flow series, a convergent portion and a divergent portion wherein the centre-body includes a waist and a parallel portion and when the centre-body is in the forward position the waist of said centre-body is axially aligned with the core exhaust exit area thereby providing maximum core exhaust exit areas; when the centre-body is in the rearward position the said parallel portion is axially aligned with said core exhaust exit area and thereby minimising the core exhaust exit area.

13. An exhaust nozzle assembly as claimed in claim 9 wherein in the rearward position the engine is in high-speed mode and in the forward position the engine is in low-speed mode.

14. An exhaust nozzle assembly as claimed in claim 9 wherein between low-speed mode and high-speed mode of the engine's operation the centre-body is positioned between the forward position and the rearward position.

* * * * *